Patented Feb. 2, 1937

2,069,624

UNITED STATES PATENT OFFICE 2,069,624

PRODUCTION OF ISOBUTYLENE AND TERTIARY BUTYL CHLORIDE

Carl F. Prutton, Cleveland, Ohio, and Walter E. Roush, Midland, Mich., assignors to The Dow Chemical Company, Midland, Mich., a corporation of Michigan No Drawing. Application May 9, 1934, Serial No. 724,822

4 Claims. (Cl. 260—170)

This invention concerns an improved method of producing isobutylene and tertiary butyl chloride from isobutane. It particularly concerns a method of pyrolyzing isobutane whereby isobutylene may be formed in good yield and in a form relatively free of organic by-products.

It is known that isobutylene is formed along with other products when isobutane is heated to a pyrolyzing temperature, but insofar as we are aware no prior worker has succeeded in producing isobutylene in good yield by such method, the product obtained consisting of a mixture of isobutylene, propylene, ethylene, acetylene, methane, hydrogen, etc., in which the isobutylene occurs in relatively small proportion.

It is an object of the present invention to provide a method of pyrolyzing isobutane whereby isobutylene can be produced in higher yield as the major product of the pyrolysis. A further object is to provide a method whereby substantially pure tertiary butyl chloride may be prepared from the crude isobutylene without separating the latter from the pyrolyzed mixture.

We have discovered that by pyrolyzing isobutane at a temperature between 500° and 600° C., preferably between 540° and 560° C., in contact with activated charcoal as catalyst, isobutylene is produced in good yield as the major reaction product. In order to obtain such result, however, we have found that the entire catalyst body should be maintained at a temperature not exceeding 600° C., preferably below 560° C.

When operating on a laboratory scale, the necessary pyrolysis temperature can be maintained satisfactorily by externally heating the charcoal body during passage of isobutane therethrough. In large scale operations, however, it would become necessary to heat the outer portions of the charcoal bed to excessive temperatures in order to obtain a satisfactory pyrolysis temperature throughout, with the result that by-product formation would occur to an objectionable extent and isobutylene would be obtained in low yield. We have found that the pyrolysis temperature can in all instances be controlled readily and accurately by first preheating the incoming isobutane gas to a temperature between about 350° and 600° C., preferably to approximately the temperature at which the pyrolysis is to be carried out, and then passing the preheated gas through a pervious bed of granular activated charcoal through which an electric current of sufficient intensity is passed to maintain the bed at the desired temperature. By operating in such manner, the charcoal serves both as a catalyst for the pyrolysis and as a heating medium. The invention, accordingly, consists in the method of producing isobutylene hereinafter fully described and particularly pointed out in the claims.

Isobutane is preheated, in the substantial absence of a catalyst capable of causing decomposition thereof, to a temperature above 350° C., preferably to approximately the temperature at which the pyrolysis is to be carried out, by passage through any suitable preheater, preferably by heat interchange with gases issuing from the pyrolyzing chamber. The preheated isobutane is then passed through a bed of granular activated charcoal which is maintained at a temperature between 500° and 600° C. by passage of an electric current therethrough. The gas may be passed through the charcoal bed at any desired rate, but the yield of isobutylene on reacted isobutane is highest when the rate is such that the gas passing through the heated charcoal is contacted with the latter for a period not exceeding 0.5 minute. In general, as the rate of gas flow is increased, the yield of isobutylene on reacted isobutane becomes higher, but the proportion of isobutane undergoing reaction is lessened. Conversely, as the rate of gas flow is lessened, the proportion of isobutane undergoing reaction is increased, but the yield of isobutylene is lowered and by-products, e. g. methane, ethane, propane, ethylene, propylene, etc., are formed to an increasing extent.

The gases issuing from the charcoal bed are cooled and may then be compressed to the liquid state and fractionally distilled to separate the isobutylene product. However, one or more redistillations are usually necessary in order to separate pure isobutylene by such procedure. In practice, we prefer to cool the crude pyrolyzed gas mixture to a temperature below 150° C., preferably below 100° C., and add thereto hydrogen chloride in amount sufficient to react with the isobutylene present. The mixture is then contacted with a catalyst, e. g. kaolin, antimony trichloride, bismuth trichloride, etc., which is capable of promoting reaction between the isobutylene and hydrogen chloride. Isobutylene, being the most reactive of the olefines present in the pyrolyzed mixture, reacts selectively with the hydrogen chloride to form tertiary butyl chloride. The latter is condensed from the unreacted gas, which is then washed free of hydrogen chloride with water, dried, and recycled in the process.

By operating in the manner described above, as much as 28 per cent of the isobutane can be cracked in a single pass through the pyrolyzing zone and pure tertiary butyl chloride can be produced from the crude pyrolyzed gas mixture in a yield greater than 75 per cent of theoretical, based on the quantity of isobutane reacted.

During pyrolysis of isobutane by the method described above, the activated charcoal gradually loses its activity as a catalyst, with the result that the proportion of isobutane undergoing reaction in a single pass decreases slowly. When necessary, the charcoal may be reactivated by heating it to about 700° C. or thereabove and passing a slow stream of superheated steam through the same, care being taken to avoid excessive loss of the charcoal by oxidation.

The following examples illustrate certain ways in which the principle of our invention has been applied, but are not to be construed as limiting the invention.

*Example 1*

Gaseous isobutane was passed, at a rate of 5.15 pounds per hour for a period of 12 hours, first through a preheater wherein it was preheated to approximately 550° C., and then through a silica tube filled with granular activated charcoal maintained at about 550° C. by passage of an electric current therethrough. The gas issuing from the silica tube was passed through a cooler, wherein it was cooled to about room temperature. It was then condensed under pressure. 17.2 pounds of isobutane, or 27.8 per cent of the isobutane employed, was decomposed in a single pass and 12.45 pounds of isobutylene produced. The yield of isobutylene was, accordingly, 75 per cent of theoretical based on the isobutane reacted.

*Example 2*

Isobutane was pyrolyzed by procedure similar to that described in Example 1 to obtain a gaseous mixture containing approximately 17 per cent by volume of isobutylene. The gas issuing from the pyrolyzing zone was cooled to approximately 80° C., treated with hydrogen chloride in amount representing approximately the chemical equivalent of the isobutylene present, and then passed, at the above mentioned temperature, through a tube filled with approximately 13.5 pounds of granular kaolin. The gases issuing from the tube were passed through a dephlegmator wherein substantially pure tertiary butyl chloride was condensed therefrom. The yield of tertiary butyl chloride was 92.5 per cent of theoretical, based on the quantity of isobutylene present in the crude pyrolyzed gases.

The steps of pyrolyzing isobutane to produce isobutylene and of converting the isobutylene into tertiary butyl chloride by our method are conveniently carried out at approximately atmospheric pressure, but either or both of said steps may, if desired, be carried out at reduced or increased pressures.

Other modes of applying the principle of our invention may be employed instead of those explained, change being made as regards the method herein disclosed, provided the step or steps stated by any of the following claims or the equivalent thereof be employed.

We therefore particularly point out and distinctly claim as our invention:—

1. The method which comprises passing isobutane through a body of activated charcoal while maintaining the latter at a temperature substantially above 500° and not exceeding 600° C.

2. The method which comprises preheating isobutane to a temperature between 350° and 600° C. and passing the preheated vapors through a body of activated charcoal while maintaining the latter at a temperature substantially above 500° and not exceeding 600° C. by passing an electric current therethrough.

3. The method which comprises preheating isobutane to a temperature between 500° and 600° C. and passing the preheated isobutane through a body of activated charcoal while maintaining the latter at a temperature between about 540° and about 560° C. by passing an electric current therethrough.

4. The method which comprises preheating isobutane to a temperature between 500° and 600° C. and passing the preheated isobutane through a body of sub-divided activated charcoal, at such rate that the isobutane is contacted with the charcoal for a period not exceeding 0.5 minute, while maintaining the body of charcoal at a temperature between about 540° and about 560° C. by passage of an electric current therethrough.

CARL F. PRUTTON.
WALTER E. ROUSH.